United States Patent
Robert et al.

(10) Patent No.: US 12,556,683 B2
(45) Date of Patent: Feb. 17, 2026

(54) INTRA BLOCK COPY WITH TEMPLATE MATCHING FOR VIDEO ENCODING AND DECODING

(71) Applicant: InterDigital CE Patent Holdings, SAS, Paris (FR)

(72) Inventors: Antoine Robert, Mezieres sur Couesnon (FR); Karam Naser, Mouaze (FR); Tangi Poirier, Thorigne-Fouillard (FR); Gaelle Martin-Cocher, Toronto (CA)

(73) Assignee: InterDigital CE Patent Holdings, SAS, Paris (FR)

( * ) Notice: Subject to any disclaimer, the term of this patent is extended or adjusted under 35 U.S.C. 154(b) by 133 days.

(21) Appl. No.: 18/285,935

(22) PCT Filed: Mar. 1, 2022

(86) PCT No.: PCT/EP2022/055166
§ 371 (c)(1),
(2) Date: Oct. 6, 2023

(87) PCT Pub. No.: WO2022/214244
PCT Pub. Date: Oct. 13, 2022

(65) Prior Publication Data
US 2024/0205386 A1  Jun. 20, 2024

(30) Foreign Application Priority Data
Apr. 9, 2021 (EP) .................................... 21305470

(51) Int. Cl.
*H04N 19/105* (2014.01)
*H04N 19/176* (2014.01)
(52) U.S. Cl.
CPC ......... *H04N 19/105* (2014.11); *H04N 19/176* (2014.11)

(58) Field of Classification Search
CPC .......................... H04N 19/105; H04N 19/176
See application file for complete search history.

(56) References Cited

U.S. PATENT DOCUMENTS

| | | | | |
|---|---|---|---|---|
| 2004/0037467 | A1* | 2/2004 | Wenzel | G06V 10/752 382/203 |
| 2013/0343610 | A1* | 12/2013 | Dal Mutto | G06V 40/107 382/103 |

(Continued)

OTHER PUBLICATIONS

Xu et al., "CE8-2.2: Current picture referencing using reference index signaling", Joint Video Experts Team (JVET) of ITU-T SG 16 WP 3 and ISO/IEC JTC 1/SC 29/WG 11, Document: JVET-K0076-v2, 11th Meeting: Ljubljana, Slovenia, Jul. 10, 2018, 5 pages.

(Continued)

*Primary Examiner* — Jonathan R Messmore
(74) *Attorney, Agent, or Firm* — Condo Roccia Koptiw LLP

(57) ABSTRACT

In a video coding system, it is proposed to improve the intra prediction based on intra-block copy by allowing a decoder-side refinement allowing further refinement of the block vector obtained from IBC using a template matching process. In this template matching, the decoder searches in an iterative process the best match for the current block (L-shaped) template within the reconstructed area, adjacent to the block vector determined using the IBC 10 prediction. This technique allows to obtain a finer precision that what is possible with IBC while minimizing the amount of coding information. In at least one embodiment where a coarse precision is used for IBC, it allows at the same time to benefit from significant coding gain provided by IBC while providing a much finer precision with reduced signaling of the block vector.

18 Claims, 11 Drawing Sheets

(56) References Cited

U.S. PATENT DOCUMENTS

| | | | | |
|---|---|---|---|---|
| 2016/0300586 | A1* | 10/2016 | Hoerichü | G10L 19/167 |
| 2020/0137416 | A1* | 4/2020 | Esenlik | H04N 19/533 |
| 2020/0213612 | A1 | 7/2020 | Liu et al. | |
| 2020/0267409 | A1* | 8/2020 | Stepin | H04N 19/137 |
| 2020/0374543 | A1 | 11/2020 | Liu et al. | |
| 2020/0413048 | A1 | 12/2020 | Zhang et al. | |

OTHER PUBLICATIONS

"Information Technology—Generic Coding of Moving Pictures and Associated Audio Information: Video", International Organization for Standardization (ISO) and the International Electrotechnical Commission (IEC), International Standard 13818-2, Recommendation ITU-T H.262, Document ISO 13818-2: 1995 (E), 1995, 255 pages.

"Infrastructure of audiovisual services—Coding of moving video—High Efficiency Video Coding", International Telecommunication Union, Telecommunication Standardization Sector of ITU, Series H: Audiovisual and Multimedia Systems, Recommendation ITU-T H.265, Oct. 2014, 540 pages.

Zuo et al., "Intra block copy for intra-frame coding", Joint Video Experts Team (JVET) of ITU-T SG 16 WP 3 and ISO/IEC JTC 1/SC 29/WG 11, Document: JVET-J0042-v1, 10th Meeting: San Diego, California, USA, Apr. 10, 2018, 3 pages.

Robert et al., "EE2-related: IBC with Template Matching", Joint Video Experts Team (JVET) of ITU-T SG 16 WP 3 and ISO/IEC JTC 1/SC 29, Document: JVET-Y0088-v1, 25th Meeting, by teleconference, Jan. 12, 2022, 4 pages.

Chen et al., "Improvements on Intra Block Copy in Natural Content Video Coding", Institute of Electrical and Electronics Engineers (IEEE), 2015 IEEE International Symposium on Circuits and Systems (ISCAS), Lisbon, Portugal, May 24, 2015, 4 pages.

"Infrastructure of audiovisual services—Transmission multiplexing and synchronization—Information technology—Generic coding of moving pictures and associated audio information: Systems", International Telecommunication Union, Telecommunication Standardization Sector of ITU, Series H: Audiovisual and Multimedia Systems, Recommendation ITU-T H.222.0, Jun. 2012, 228 pages.

* cited by examiner

INTRA BLOCK COPY WITH TEMPLATE MATCHING FOR VIDEO ENCODING AND DECODING

CROSS REFERENCE TO RELATED APPLICATIONS

This application is a U.S. National Stage Application under 35 U.S.C. § 371 of International Patent Application No. PCT/EP2022/055166, filed Mar. 1, 2022, which is incorporated herein by reference in its entirety.

This application claims priority to European Application No. 21305470.3 filed Apr. 9, 2021, which is incorporated herein by reference in its entirety.

TECHNICAL FIELD

The disclosure is in the field of video compression, and at least one embodiment relates more specifically to intra block copy with template matching.

BACKGROUND ART

To achieve high compression efficiency, image and video coding schemes usually employ prediction and transform to leverage spatial and temporal redundancy in the video content. Generally, intra or inter prediction is used to exploit the intra or inter frame correlation, then the differences between the original image block and the predicted image block, often denoted as prediction errors or prediction residuals, are transformed, quantized and entropy coded. During encoding, the original image block is usually partitioned/split into sub-blocks using various partitioning such as quad-tree for example. To reconstruct the video, the compressed data is decoded by inverse processes corresponding to the prediction, transform, quantization and entropy coding.

Existing methods for coding and decoding show some limitations for example when using intra prediction. Therefore, there is a need to improve the state of the art.

SUMMARY

The drawbacks and disadvantages of the prior art are solved and addressed by the general aspects described herein.

A first aspect is directed to a method comprising, for a block of a picture of a video, determining a template based on samples adjacent to the block: selecting a matching template among a set of template candidates in reconstructed blocks of the picture, and reconstructing the block by copying samples of the selected template into the block. In a further embodiment of first aspect, the selection step further comprises: determining a location of a template and a precision for a search: determining a set of template candidates based on the location and the precision, wherein the template candidates also comprise a template at current location: measuring similarity between samples of the template and samples of the template candidates and selecting the template with best similarity.

A second aspect is directed to a method comprising, obtaining data representative of a block of a picture of a video, reconstructing a block of a picture of a video according to the first aspect or any of its variants: and decoding picture data using the reconstructed block.

A third aspect is directed to a method comprising, obtaining data representative of a block of a picture of a video, reconstructing a block of a picture of a video according to the first aspect or any of its variants: and encoding picture data using the reconstructed block.

A fourth aspect is directed to an apparatus comprising a decoder configured to obtain data representative of a block of a picture of a video, reconstruct a block of a picture of a video according to the first aspect or any of its variants: and decode picture data using the reconstructed block.

A fifth aspect is directed to an apparatus comprising an encoder configured to obtain data representative of a block of a picture of a video, reconstruct a block of a picture of a video according to the first aspect or any of its variants: and encode picture data using the reconstructed block.

According to a general aspect of at least one embodiment, there is provided a computer program product comprising instructions which, when the program is executed by a processor, cause the processor to carry out any of the described encoding/decoding embodiments or variants.

According to a general aspect of at least one embodiment, there is provided a non-transitory computer readable medium storing program code instructions for implementing the steps of a method according to any of the described encoding embodiments or variants.

DETAILED DESCRIPTION

Various embodiments relate to a video coding system in which, in at least one embodiment, it is proposed to improve the intra prediction part of video compression by extending the block matching process of the intra-block copy (IBC) tool using a further refinement based on template matching in order to find a L-shaped neighboring pixels (called template) within the already reconstructed blocks of the picture that best matches the current block's template.

Encoding method, decoding method, encoding apparatus, decoding apparatus based on this principle are proposed.

Moreover, the present aspects, although describing principles related to particular drafts of VVC (Versatile Video Coding) or to HEVC (High Efficiency Video Coding) specifications, are not limited to VVC or HEVC, and can be applied, for example, to other standards and recommendations, whether pre-existing or future-developed, and extensions of any such standards and recommendations (including VVC and HEVC). Unless indicated otherwise, or technically precluded, the aspects described in this application can be used individually or in combination.

Figure 1:
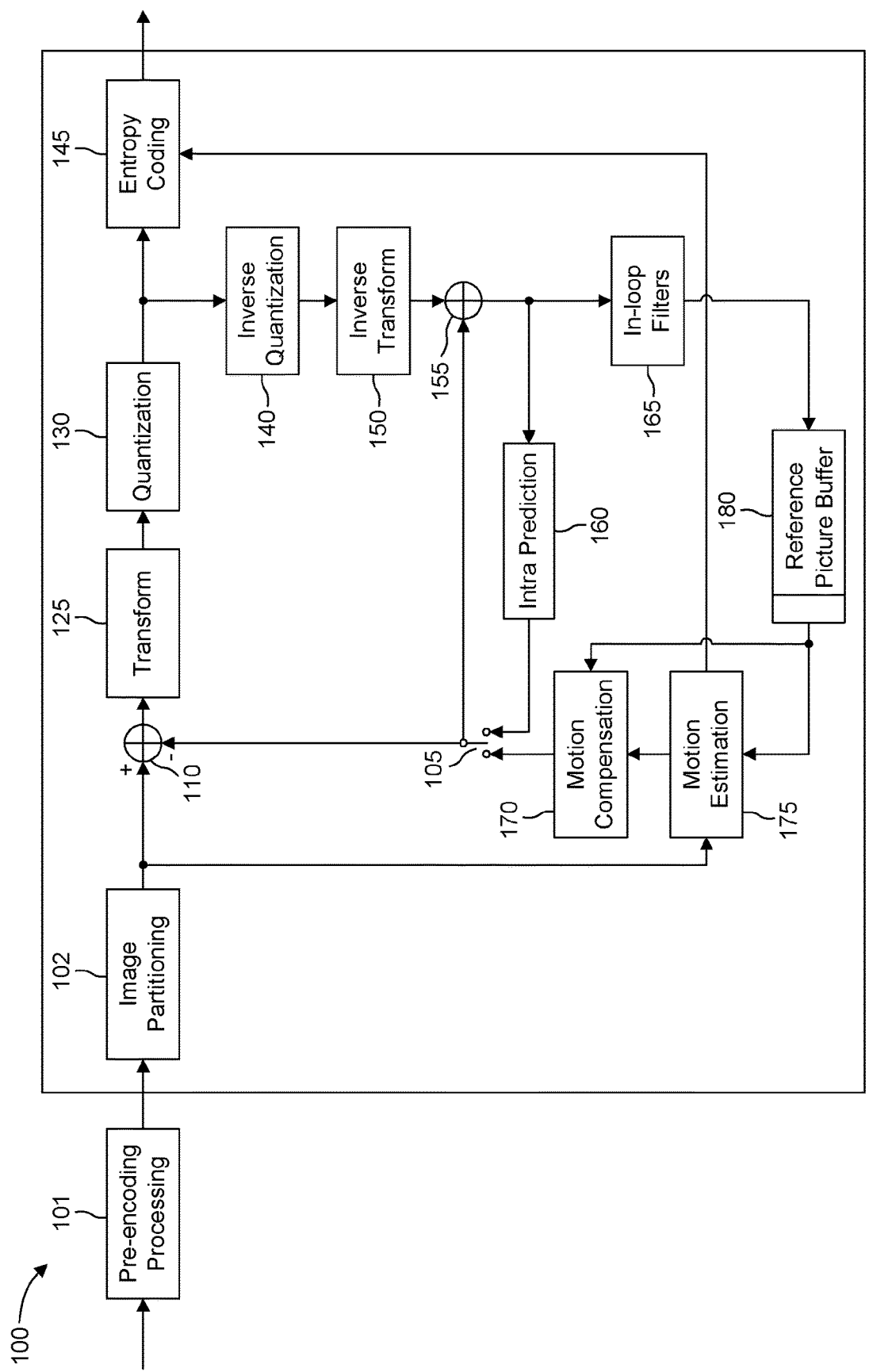
FIG. 1 illustrates a block diagram of a video encoder according to an embodiment.

FIG. 1 illustrates a block diagram of a video encoder 100 according to an embodiment. Variations of this encoder 100 are contemplated, but the encoder 100 is described below for purposes of clarity without describing all expected variations. Before being encoded, the video sequence may go through pre-encoding processing (101), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata can be associated with the pre-processing and attached to the bitstream.

In the encoder 100, a picture is encoded by the encoder elements as described below. The picture to be encoded is partitioned (102) and processed in units of, for example, CUs. Each unit is encoded using, for example, either an intra or inter mode. When a unit is encoded in an intra mode, it performs intra prediction (160). In an inter mode, motion estimation (175) and compensation (170) are performed. The encoder decides (105) which one of the intra mode or inter mode to use for encoding the unit, and indicates the intra/inter decision by, for example, a prediction mode flag. Prediction residuals are calculated, for example, by subtracting (110) the predicted block from the original image block.

The prediction residuals are then transformed (125) and quantized (130). The quantized transform coefficients, as well as motion vectors and other syntax elements, are entropy coded (145) to output a bitstream. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture to perform, for example, deblocking/SAO (Sample Adaptive Offset), Adaptive Loop-Filter (ALF) filtering to reduce encoding artifacts. The filtered image is stored at a reference picture buffer (180).

Figure 2:
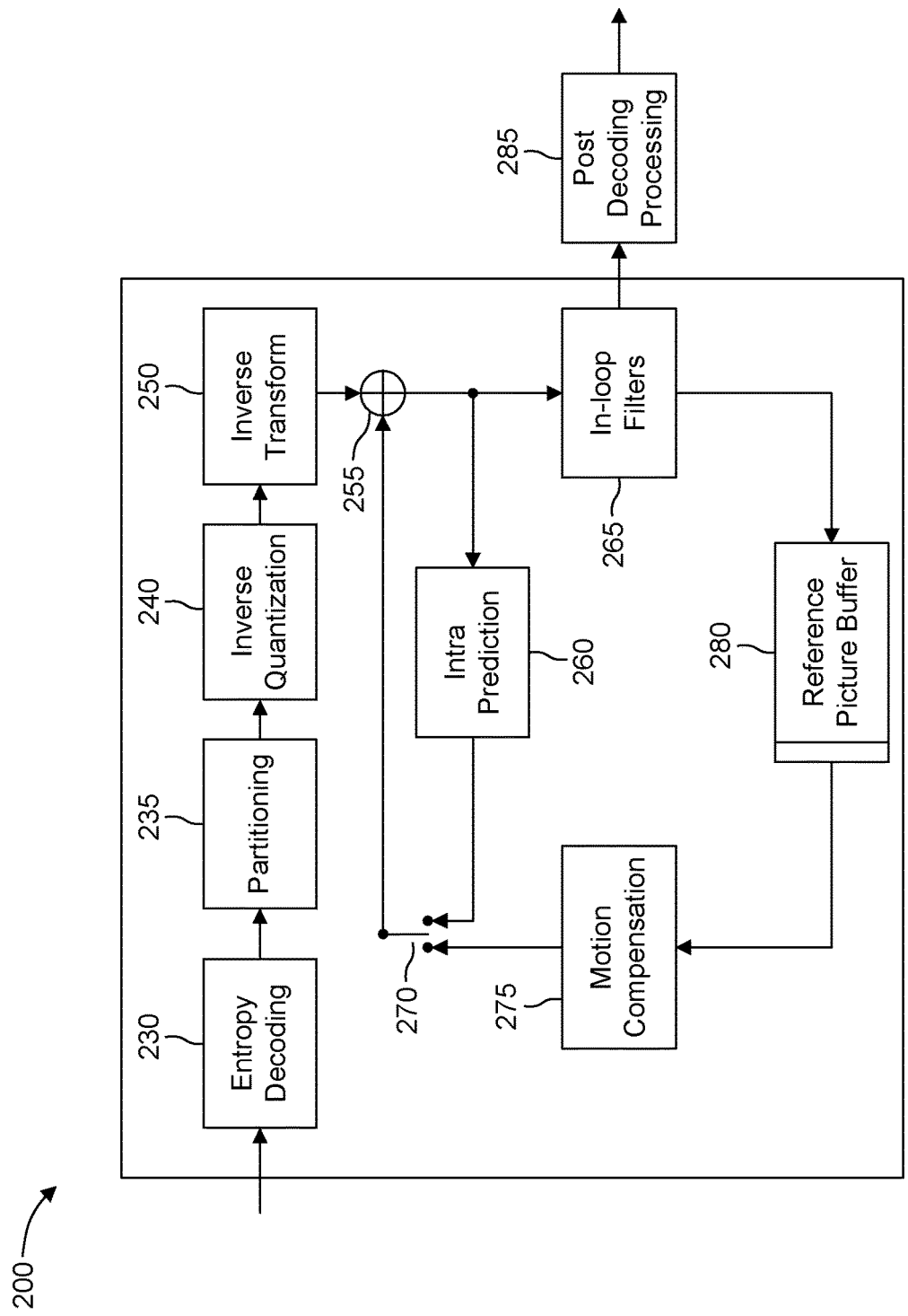
FIG. 2 illustrates a block diagram of a video decoder according to an embodiment.

FIG. 2 illustrates a block diagram of a video decoder 200 according to an embodiment. In the decoder 200, a bitstream is decoded by the decoder elements as described below: Video decoder 200 generally performs a decoding pass reciprocal to the encoding pass. The encoder 100 also generally performs video decoding as part of encoding video data. In particular, the input of the decoder includes a video bitstream, which can be generated by video encoder 100. The bitstream is first entropy decoded (230) to obtain transform coefficients, motion vectors, and other coded information. The picture partition information indicates how the picture is partitioned. The decoder may therefore divide (235) the picture according to the decoded picture partitioning information. The transform coefficients are de-quantized (240)) and inverse transformed (250) to decode the prediction residuals. Combining (255) the decoded prediction residuals and the predicted block, an image block is reconstructed. The predicted block can be obtained (270) from intra prediction (260) or motion-compensated prediction (i.e., inter prediction) (275). In-loop filters (265) are applied to the reconstructed image. The filtered image is stored at a reference picture buffer (280)).

The decoded picture can further go through post-decoding processing (285), for example, an inverse color transform (e.g. conversion from YCbCr 4:2:0 to RGB 4:4:4) or an inverse remapping performing the inverse of the remapping process performed in the pre-encoding processing (101). The post-decoding processing can use metadata derived in the pre-encoding processing and signaled in the bitstream.

Figure 3:
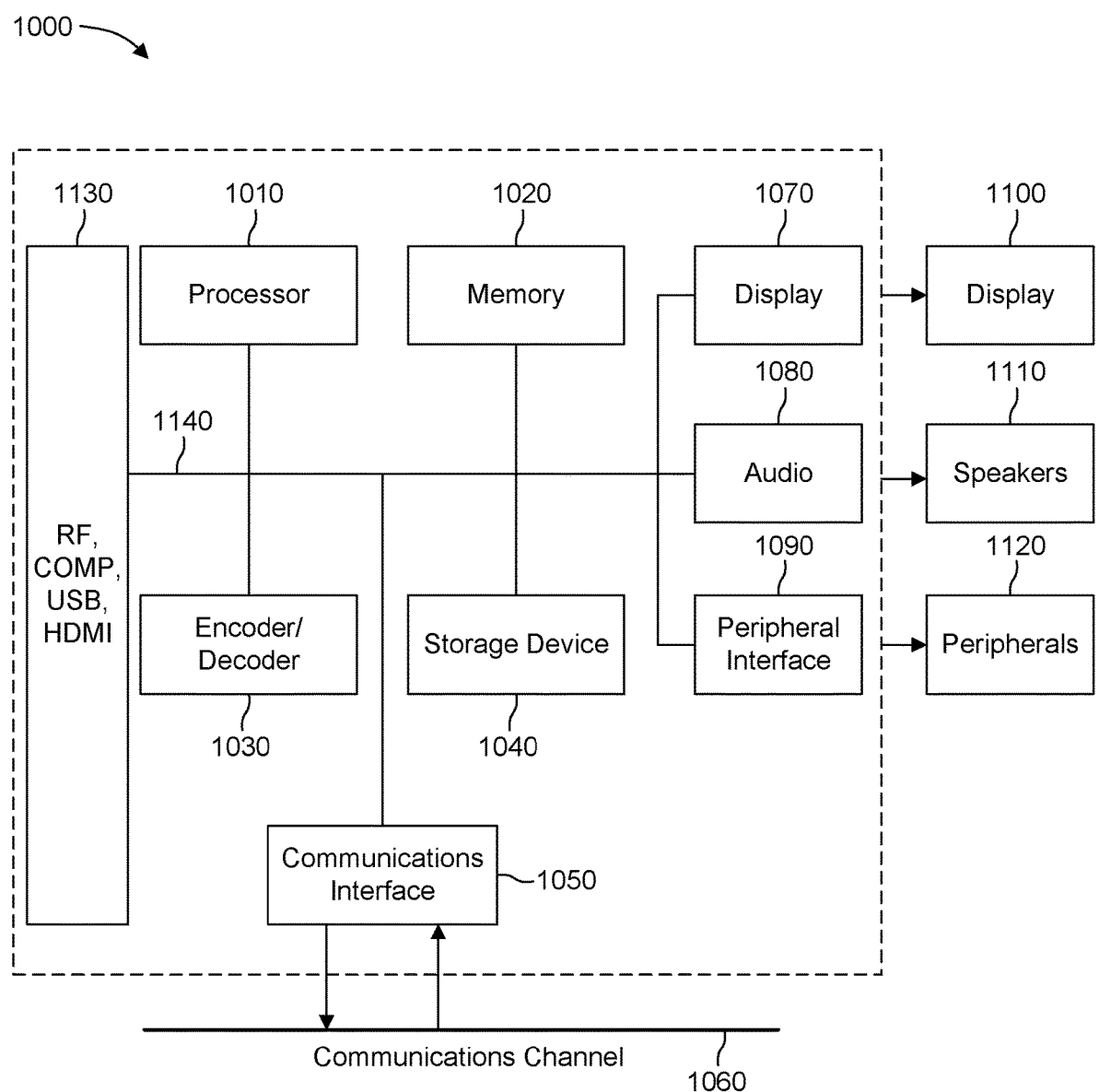
FIG. 3 illustrates a block diagram of an example of a system in which various aspects and embodiments are implemented.

FIG. 3 illustrates a block diagram of an example of a system in which various aspects and embodiments are implemented. System 1000 can be embodied as a device including the various components described below and is configured to perform one or more of the aspects described in this document. Examples of such devices include, but are not limited to, various electronic devices such as personal computers, laptop computers, smartphones, tablet computers, digital multimedia set top boxes, digital television receivers, personal video recording systems, connected home appliances, and servers. Elements of system 1000, singly or in combination, can be embodied in a single integrated circuit (IC), multiple ICs, and/or discrete components. For example, in at least one embodiment, the processing and encoder/decoder elements of system 1000 are distributed across multiple ICs and/or discrete components. In various embodiments, the system 1000 is communicatively coupled to one or more other systems, or other electronic devices, via, for example, a communications bus or through dedicated input and/or output ports. In various embodiments, the system 1000 is configured to implement one or more of the aspects described in this document.

The system 1000 includes at least one processor 1010 configured to execute instructions loaded therein for implementing, for example, the various aspects described in this document. The processor 1010 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 1010 can include embedded memory, input output interface, and various other circuitries as known in the art. The system 1000 includes at least one memory 1020 (e.g., a volatile memory device, and/or a non-volatile memory device). System 1000 includes a storage device 1040, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive. The storage device 1040 can include an internal storage device, an attached storage device (including detachable and non-detachable storage devices), and/or a network accessible storage device, as non-limiting examples.

System 1000 includes an encoder/decoder module 1030 configured, for example, to process data to provide an encoded video or decoded video, and the encoder/decoder module 1030 can include its own processor and memory. The encoder/decoder module 1030 represents module(s) that can be included in a device to perform the encoding and/or decoding functions. As is known, a device can include one or both of the encoding and decoding modules. Additionally, encoder/decoder module 1030 can be implemented as a separate element of system 1000 or can be incorporated within processor 1010 as a combination of hardware and software as known to those skilled in the art.

Program code to be loaded onto processor 1010 or encoder/decoder 1030 to perform the various aspects described in this document can be stored in storage device 1040 and subsequently loaded onto memory 1020 for execution by processor 1010. In accordance with various embodiments, one or more of processor 1010, memory 1020, storage device 1040, and encoder/decoder module 1030 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In some embodiments, memory inside of the processor 1010 and/or the encoder/decoder module 1030 is used to store instructions and to provide working memory for processing that is needed during encoding or decoding. In other embodiments, however, a memory external to the processing device (for example, the processing device can be either the processor 1010 or the encoder/decoder module 1030) is used for one or more of these functions. The external memory can be the memory 1020 and/or the storage device 1040, for example, a dynamic volatile memory and/or a non-volatile flash memory. In several embodiments, an external non-volatile flash memory is used to store the operating system of, for example, a television. In at least one embodiment, a fast external dynamic volatile memory such as a RAM is used as working memory for video coding and decoding operations, such as for MPEG-2 (MPEG refers to the Moving Picture Experts Group, MPEG-2 is also referred to as ISO/IEC 13818, and 13818-1 is also known as H.222, and 13818-2 is also known as H.262), HEVC (HEVC refers to High Efficiency Video Coding, also known as H.265 and MPEG-H Part 2), or VVC (Versatile Video Coding, a new standard being developed by JVET, the Joint Video Experts Team).

The input to the elements of system 1000 can be provided through various input devices as indicated in block 1130. Such input devices include, but are not limited to, (i) a radio frequency (RF) portion that receives an RF signal transmitted, for example, over the air by a broadcaster, (ii) a Component (COMP) input terminal (or a set of COMP input terminals), (iii) a Universal Serial Bus (USB) input terminal, and/or (iv) a High Definition Multimedia Interface (HDMI) input terminal. Other examples, not shown in FIG. 3, include composite video.

In various embodiments, the input devices of block 1130 have associated respective input processing elements as known in the art. For example, the RF portion can be associated with elements suitable for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which can be referred to as a channel in certain embodiments, (iv) demodulating the downconverted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, downconverting, and filtering again to a desired frequency band. Various embodiments rearrange the order of the above-described (and other) elements, remove some of these elements, and/or add other elements performing similar or different functions. Adding elements can include inserting elements in between existing elements, such as, for example, inserting amplifiers and an analog-to-digital converter. In various embodiments, the RF portion includes an antenna.

Additionally, the USB and/or HDMI terminals can include respective interface processors for connecting system 1000 to other electronic devices across USB and/or HDMI connections. It is to be understood that various aspects of input processing, for example, Reed-Solomon error correction, can be implemented, for example, within a separate input processing IC or within processor 1010 as necessary. Similarly, aspects of USB or HDMI interface processing can be implemented within separate interface ICs or within processor 1010 as necessary. The demodulated, error corrected, and demultiplexed stream is provided to various processing elements, including, for example, processor 1010, and encoder/decoder 1030 operating in combination with the memory and storage elements to process the datastream as necessary for presentation on an output device.

Various elements of system 1000 can be provided within an integrated housing, Within the integrated housing, the various elements can be interconnected and transmit data therebetween using suitable connection arrangement 1140, for example, an internal bus as known in the art, including the Inter-IC (12C) bus, wiring, and printed circuit boards.

The system 1000 includes communication interface 1050 that enables communication with other devices via communication channel 1060. The communication interface 1050 can include, but is not limited to, a transceiver configured to transmit and to receive data over communication channel 1060. The communication interface 1050 can include, but is not limited to, a modem or network card and the communication channel 1060 can be implemented, for example, within a wired and/or a wireless medium.

Data is streamed, or otherwise provided, to the system 1000, in various embodiments, using a wireless network such as a Wi-Fi network, for example IEEE 802.11 (IEEE refers to the Institute of Electrical and Electronics Engineers). The Wi-Fi signal of these embodiments is received over the communications channel 1060 and the communications interface 1050 which are adapted for Wi-Fi communications. The communications channel 1060 of these embodiments is typically connected to an access point or router that provides access to external networks including the Internet for allowing streaming applications and other over-the-top communications. Other embodiments provide streamed data to the system 1000 using a set-top box that delivers the data over the HDMI connection of the input block 1130. Still other embodiments provide streamed data to the system 1000 using the RF connection of the input block 1130. As indicated above, various embodiments provide data in a non-streaming manner. Additionally, various embodiments use wireless networks other than Wi-Fi, for example a cellular network or a Bluetooth network.

The system 1000 can provide an output signal to various output devices, including a display 1100, speakers 1110, and other peripheral devices 1120. The display 1100 of various embodiments includes one or more of, for example, a touchscreen display, an organic light-emitting diode (OLED) display, a curved display, and/or a foldable display. The display 1100 can be for a television, a tablet, a laptop, a cell phone (mobile phone), or other devices. The display 1100 can also be integrated with other components (for example, as in a smart phone), or separate (for example, an external monitor for a laptop). The other peripheral devices 1120 include, in various examples of embodiments, one or more of a stand-alone digital video disc (or digital versatile disc) (DVR, for both terms), a disk player, a stereo system, and/or a lighting system. Various embodiments use one or more peripheral devices 1120 that provide a function based on the output of the system 1000. For example, a disk player performs the function of playing the output of the system 1000.

In various embodiments, control signals are communicated between the system 1000 and the display 1100, speakers 1110, or other peripheral devices 1120 using signaling such as AV.Link, Consumer Electronics Control (CEC), or other communications protocols that enable device-to-device control with or without user intervention. The output devices can be communicatively coupled to system 1000 via dedicated connections through respective interfaces 1070, 1080, and 1090. Alternatively, the output devices can be connected to system 1000 using the communications channel 1060 via the communications interface 1050. The display 1100 and speakers 1110 can be integrated in a single unit with the other components of system 1000 in an electronic device such as, for example, a television. In various embodiments, the display interface 1070 includes a display driver, such as, for example, a timing controller (T Con) chip.

The display 1100 and speaker 1110 can alternatively be separate from one or more of the other components, for example, if the RF portion of input 1130 is part of a separate set-top box. In various embodiments in which the display 1100 and speakers 1110 are external components, the output signal can be provided via dedicated output connections, including, for example, HDMI ports, USB ports, or COMP outputs.

The embodiments can be carried out by computer software implemented by the processor 1010 or by hardware, or by a combination of hardware and software. As a non-limiting example, the embodiments can be implemented by one or more integrated circuits. The memory 1020 can be of any type appropriate to the technical environment and can be implemented using any appropriate data storage technology, such as optical memory devices, magnetic memory devices, semiconductor-based memory devices, fixed memory, and removable memory, as non-limiting examples. The processor 1010 can be of any type appropriate to the technical environment, and can encompass one or more of microprocessors, general purpose computers, special purpose computers, and processors based on a multi-core architecture, as non-limiting examples.

The technical field of the invention is related to the intra prediction stage of a video compression scheme.

Figure 4A:
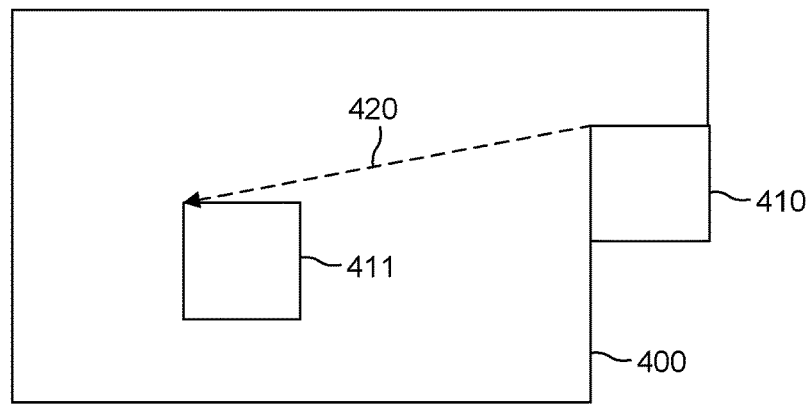
FIG. 4A illustrates the principles of intra prediction using intra block copy.

FIG. 4A illustrates the principles of intra prediction using intra block copy. Intra-block copy (IBC) is a tool particularly adapted to so-called screen content coding, i.e. non-natural computer generated sequences that includes large identical areas such as user interface screens. IBC is based on finding a matching reference block within a reconstructed area 400 of the current frame. At the encoding, when a match is found between the current block 410 and a reconstructed block 411, the so-called block vector 420 between the current block and the matching block, analogous to a motion vector, is selected for reconstructing the block. In one example of IBC mode, the current block 410 is reconstructed by copying the samples of the block 411.

IBC AMVP mode proposes to use conventional AMVP mode inter-prediction motion related techniques restricted to the reconstructed samples. More particularly, at encoder, the IBC AMVP mode selects several already used input vectors as predictors (or zeros) and performs, for each, a process similar to a motion estimation to find within a window in the reconstructed samples the block that is the most similar to the current block. A RDO process allows then selecting the best predictor. The index of this best predictor and the vector differential as the difference between the estimated and the input vector are signalled. At decoder, the IBC AMVP mode selects the same input vectors. It adds the transmitted vector difference to the input vector indicated by the signalled index and reconstructs the current block by using the resulting vector.

IBC merge mode proposes to use conventional merge mode inter-prediction motion related techniques restricted to the reconstructed samples. More particularly, at encoder, the IBC merge mode selects several already used input vectors as predictors. A RDO process allows then selecting the best predictor. The index of this best predictor is signalled. At decoder, the IBC merge mode selects the same input vectors and uses the input vector indicated by the transmitted index to reconstruct the current block.

Figure 4B:
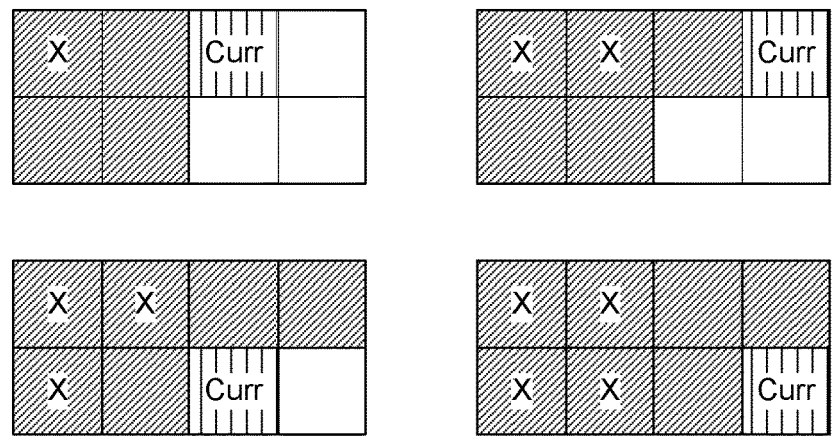
FIG. 4B illustrates the allowed search range for intra block copy for the current block.

FIG. 4B illustrates the allowed search range for intra block copy for the current block. Indeed, in an example implementation using VVC, the search range is extended to pixels beyond the current coding tree unit (CTU), to the left CTU depending on the block position. However, some block positions are not allowed and cannot be used for IBC. In this figure, the current block within the current CTU is identified by "curr" while the not-allowed blocks are identified by a white cross.

Figure 4C:
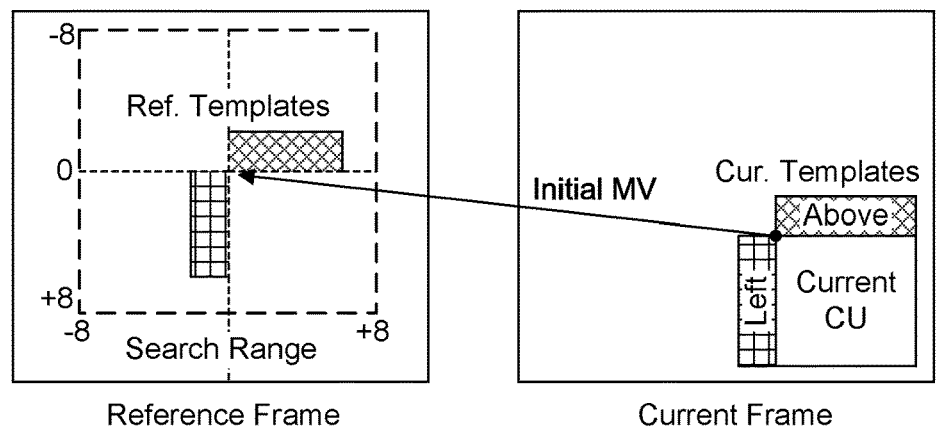
FIG. 4C illustrates the principle of template matching for inter coding.

FIG. 4C illustrates the principle of template matching for inter coding. The idea of motion vector refinement may be used to improve inter-coding. Specifically, a search window of 16×16 can be defined around the reference block, where a template matching process is carried out between the current block's template and the reference block template. This process is hereunder named TM search. This leads to improved motion precision without further signaling as the template matching operation is performed at both encoder and decoder side. However, this technique is being used for inter prediction.

Embodiments described hereafter have been designed with the foregoing in mind. The encoder 100 of FIG. 1, decoder 200 of FIG. 2 and system 1000 of FIG. 3 are adapted to implement at least one of the embodiments described below and more particularly the intra prediction element 160 of the encoder 100 as well as the intra prediction element 260 of the decoder 200.

In at least one embodiment, it is proposed to improve the intra prediction based on intra-block copy by allowing a decoder-side refinement, in other words, to allow a further refinement of the block vector obtained from IBC using a template matching process. In this template matching, the decoder searches in an iterative process the best match for the current block (L-shaped) template within the reconstructed area, in the neighborhood of the block vector determined using the IBC prediction. This technique allows obtaining a finer precision than what is possible with IBC while minimizing the amount of coding information. In at least one embodiment where a coarse precision is used for IBC, it allows at the same time to benefit from significant coding gain provided by IBC while providing a much finer precision with reduced signaling of the block vector.

Figure 5:
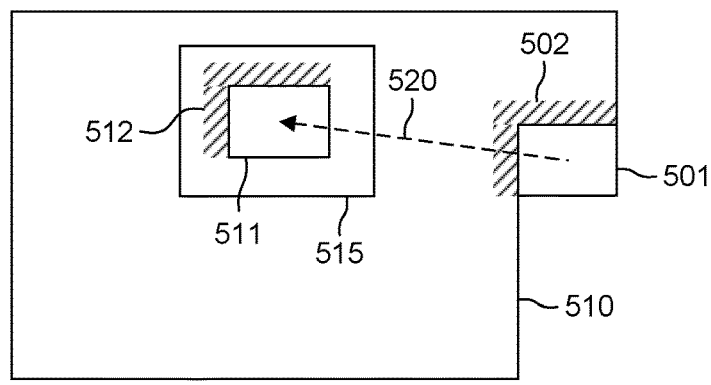
FIG. 5 illustrates the principle of intra prediction based on intra block copy using template matching according to at least one embodiment.

FIG. 5 illustrates the principle of intra prediction based on intra block copy using template matching according to at least one embodiment. Similarly to intra block coding of FIG. 4A, the idea is to reconstruct the current block by copying the samples of a block already reconstructed. However, it is proposed to perform a template matching operation based on the current block already decoded L-shape neighbors so that this operation can be done at the decoder side without additional signaling. The IBC process is first performed to yield a block vector such that the decoder determines the coordinates of the reference block (inside the current frame). A search range region is defined around the reference block, and the L-shaped neighbor pixels of the current block (current template) are used to find the best matching template within the defined search range. This leads to improve bitrate saving as finer block vector can be used without extra signaling to the decoder side. When a matching L-shape template is found, the samples of the corresponding block can be copied into the current block. The figure shows the reconstructed area 510 of the current frame. The already reconstructed above and left neighbors 502 of the current block 501 form a L-shaped template. The IBC first determines the block vector 520. A search range region 515 is then defined. Within this region, it is looked for the L-shape template 512. For that purpose, a metric for measuring similarity between samples of L-shape can be used, such as sum of average differences (SAD). The search range region is then sampled according to a determined precision and/or using different techniques to determine a set of L-shaped template candidates. Similarity is then measured between the L-shaped template candidates and the L-shaped template 502. The candidate with best similarity is then selected. As described further below, the process may iterate multiple times to cover the search range region possibly at different precision levels. When a match is determined between a L-shaped template candidate and the L-shaped template 502, the samples of the block 511 corresponding to the matching template are then directly copied into the block 501. This process applies both for encoding and for decoding and may be implemented for example in the intra-prediction module 160 of the encoder of FIG. 1 or in the intra-prediction module 260 of the decoder of FIG. 2 and more generally in the encoder/decoder module 1030 of the device 1000 of FIG. 3.

In at least one embodiment, the template matching of FIG. 5 is based on IBC merge mode. In this mode, it is proposed to use conventional merge mode inter-prediction motion related techniques restricted to the reconstructed samples. IBC merge predictor candidates are picked as for a conventional IBC merge but are then used as input vectors for TM search. TM costs (in other words, the similarity measure introduced above, for example based on SAD) of each input candidates are determined, the one having the smallest TM cost is refined towards the minimum TM cost within a search window (to be defined). This refined IBC merge predictor candidate is then used as the IBC merge vector for prediction. No index signaling is needed since candidate is selected based on its TM cost and thus the same candidate will be chosen both at encoding and at decoding.

As IBC modes only use 1-pel or 4-pel vector precision, the IBC merge refinement process can be performed towards 1-pel but can also be performed at a finer precision.

In at least one embodiment, the template matching of FIG. 5 is based on IBC AMVP mode. In this mode, it is proposed to use conventional AMVP mode inter-prediction motion related techniques restricted to the reconstructed samples. IBC AMVP predictor candidates are picked (as in conventional IBC AMVP) and used as input vectors for TM search. TM costs of each input candidates are calculated, the one having the smallest TM cost is refined towards the minimum TM cost within a search window (to be defined). This refined IBC AMVP predictor is then used as input for the motion estimation (ME) process after rounding at the needed precision. The rounding is based on AMVR. When AMVR is enabled, the precision is defined by an index in the signaling. When AMVR is disabled, the precision is set to 1-pel.

As IBC modes only use 1-pel or 4-pel vector precision, the IBC AMVP refinement process can be performed towards 1-pel but can also be performed at a finer precision (even if it must be rounded with AMVR).

Figure 6:
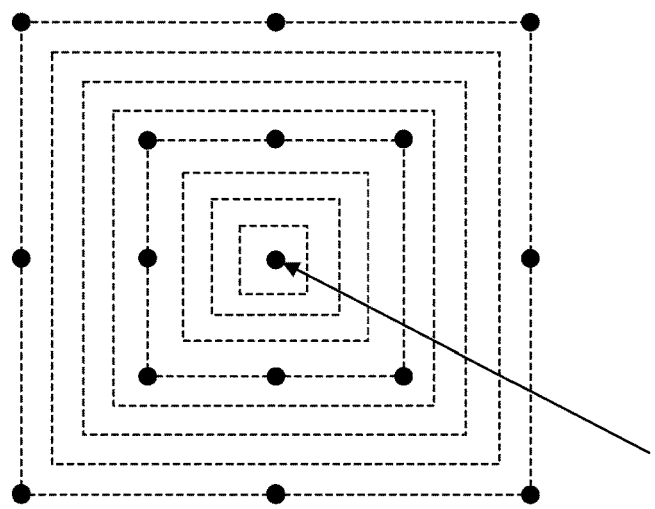
FIG. 6 illustrates an embodiment using IBC AMVP mode using a 4-pel precision.

FIG. 6 illustrates an embodiment using IBC AMVP mode using a 4-pel precision. The arrow shows an IBC block vector. In IBC AMVP mode, TM can also be used after ME where the estimated vector is refined within a search window around current position, for example a 16-pel or 32-pel window, towards the minimum TM cost. But, in that case, there are ways to reduce the number of tested positions as some have already been tested by the ME. For example, if the IBC AMVR precision is 4-pel and the refinement performed at 1-pel precision, then the 4-pel positions can be removed from the search (as already tested by ME and worse). This is shown in FIG. 6 where 4-pel positions identified by circles can be removed from TM testing at a 1-pel precision.

In at least one embodiment, the template matching is used to refine vectors at a finer precision, hereafter called TM refinement. It aims at determining samples that better match the template by overcoming the precision limitation of the block vector. As already mentioned, IBC only uses 1-pel or 4-pel precision for IBC block vectors and IBC block vector differentials (if AMVR is on, otherwise only 1-pel is used). TM can then be used in another way to refine vectors at a finer precision in both IBC merge and IBC AMVP modes. In that case, after the normal processing, the obtained vector can be further refined towards a finer precision within a TM search window that has to depend on the precision: if the precision is 1-pel then the window cannot be larger than 2-pel around the current vector or if the precision is 4-pel, the window cannot be larger than 8-pel around the current vector.

Figure 7:
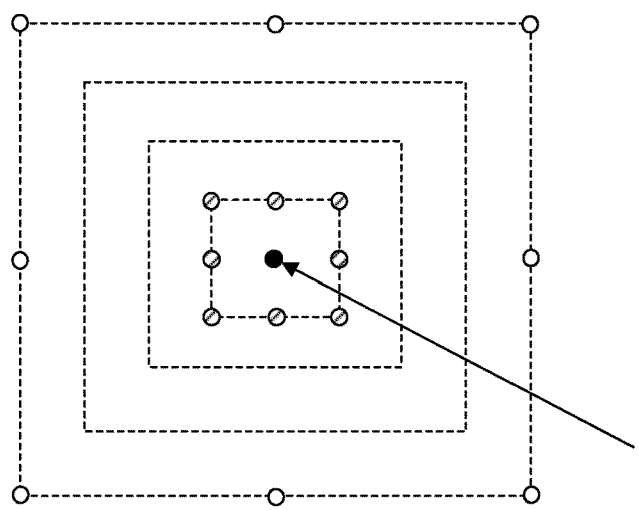
FIG. 7 illustrates an embodiment using IBC AMVP mode using a 1-pel precision.

FIG. 7 illustrates an embodiment using IBC AMVP mode using a 1-pel precision. The arrow shows an IBC block vector. In this example, if the precision is 1-pel, all surrounding (i.e. adjacent) 1-pel positions (dashed points) have already been tested by ME and are worse than current (black point) one, so refinement can only take place within this 2-pel large square search range region. If the precision is 4-pel, all surrounding 4-pel positions (white points) have already been tested by ME and are worse than the current (black point), so refinement can only take place within this 8-pel large square.

In all previous cases, the precision of the refinement process must be defined (from 1-pel or 4-pel through 1-, ½-, ¼-, ⅛-, ¹⁄₁₆-pel). Different alternatives may be used:

- In one variant embodiment, the precision of the refinement process depends on the input precision, for example from 1-pel through ¹⁄₁₆-pel and from 4-pel through ¼-pel to limit the number of refinement steps; or
- In one variant embodiment, the precision of the refinement process is fixed, for example reducing the IBC precision to only 4-pel (only IBC 4-pel is used) and the template matching allows vector refinement through 1-pel or a finer precision to avoid AMVR signalling, reduce the number of motion estimation steps and the vector differential signalling cost; or
- In one variant embodiment, the precision of the refinement process uses a coarser precision for IBC (such as 8- or 16-pel) then TM allows retrieving the 1-pel precision or a finer precision to also avoid AMVR signalling, but also reduce even more the number of motion estimation steps and the vector differential signalling cost.

It is important to notice that each time the final precision is finer than 1-pel, some sub-pixel interpolations are required. Such sub-pixel interpolations are currently avoided in IBC (only 4-pel and 1-pel are used).

In at least one embodiment, the IBC TM refinement is performed by testing all positions inside the TM search window.

In at least one embodiment, the IBC TM refinement is performed by testing a number of positions N around current position (for example, 4 or 8) then repeating this process a number of time M until minimum TM cost is reached. The whole process may refine the precision for each iteration step.

In at least one embodiment, the IBC TM refinement uses a cross (4 positions: +/−1 for x or y) or a diamond (not illustrated, 8 positions: x/−2 for x or y or +/−1 for x and y) pattern at a particular precision, then repeat it in the direction that reduces the TM cost until minimum cost is reached, and finally repeat one step by decreasing the precision until needed precision. For example, one implementation performs multiple steps at 1-pel precision to get the 1-pel position that minimizes the TM cost then around that position perform one step at ½-pel, then one step at ¼-pel, then one step at ⅛-pel, etc.

Figure 8A:
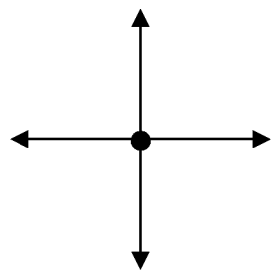
FIGS. 8A to 8J illustrate an example of cross-pattern based IBC TM refinement according to at least one embodiment.
Figure 8B:
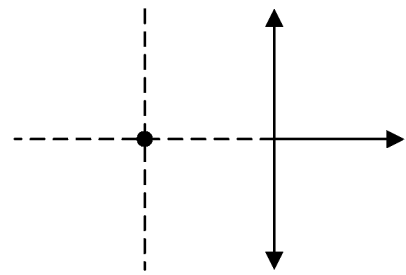
Figure 8C:
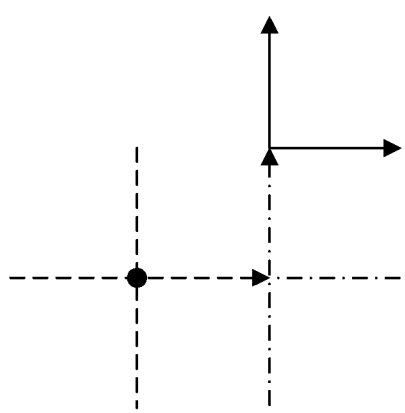
Figure 8D:
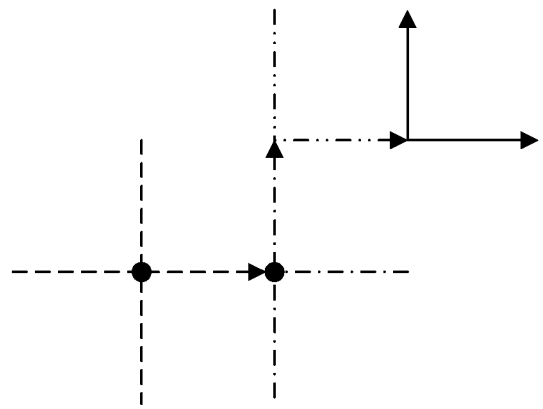
Figure 8E:
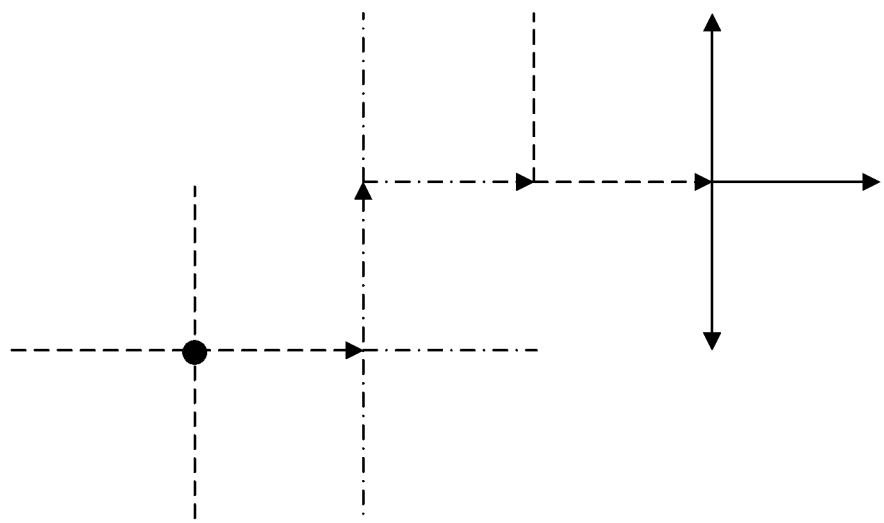
Figure 8F:
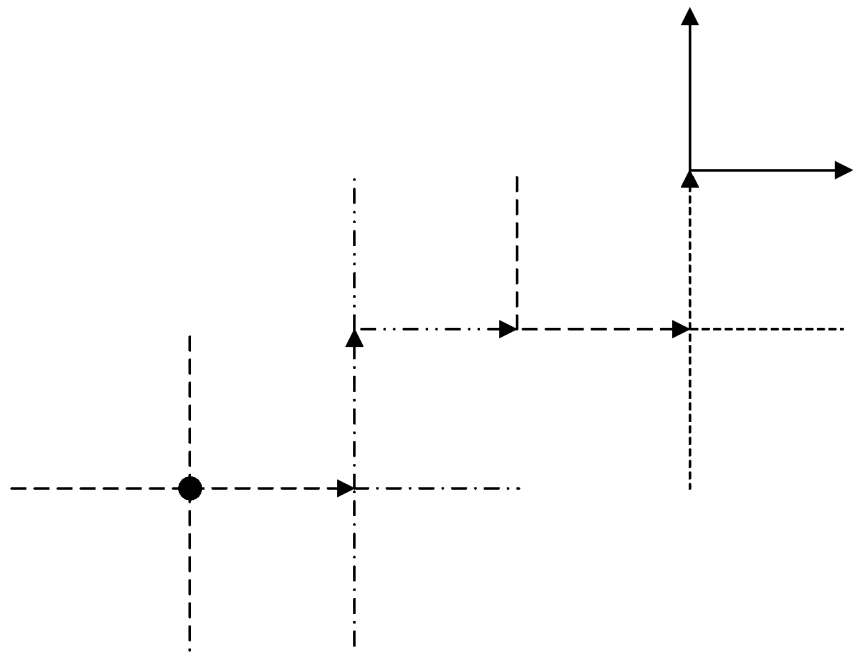
Figure 8G:
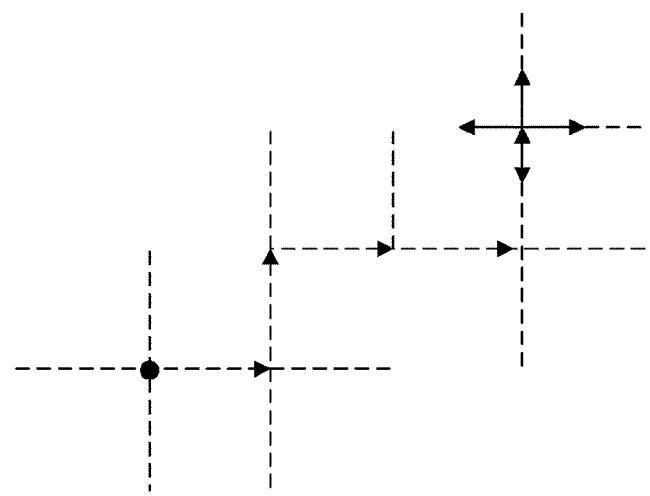
Figure 8H:
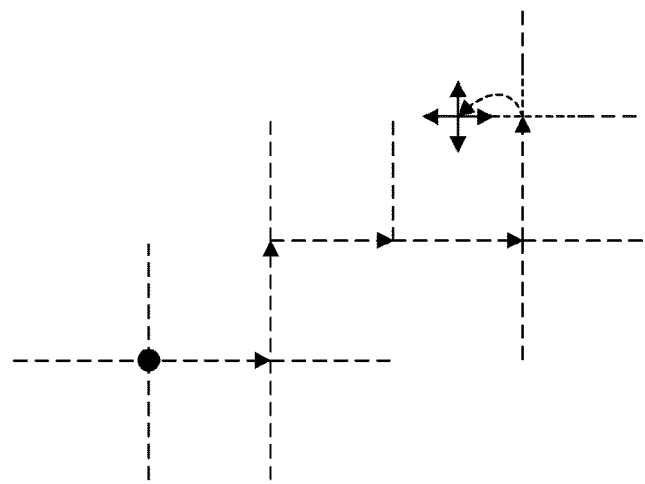
Figure 8I:
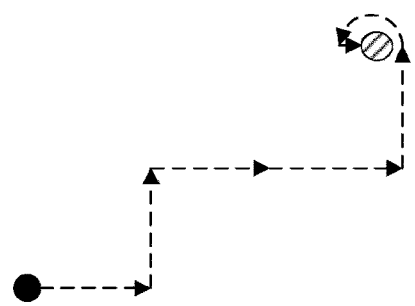
Figure 8J:
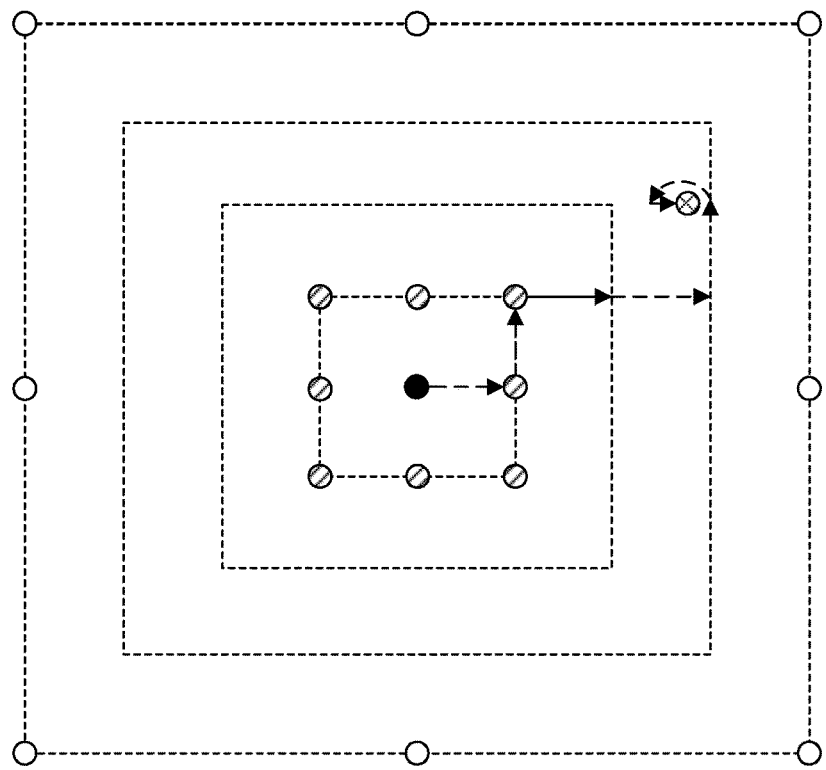

FIGS. 8A to 8J illustrate an example of cross-pattern based IBC TM refinement according to at least one embodiment. As introduced above, it is based on minimizing the TM cost for a given precision, before trying another refinement at a finer precision. In the example of FIGS. 8A to 8J, the process starts from the black point and performs 6 steps of refinement at 1-pel precision (respectively FIGS. 8A to 8F) to get the best 1-pel point (i.e. the point at 1-pel with minimal TM cost). The figures particularly illustrate that this process reduces the number of tested positions in each step since some positions have already been tested in a previous step (or are outside the TM search window—not illustrated). For example, at the first step in FIG. 8A, all four positions are tested. Since the position with the minimal TM cost is the right position, the process iterates starting from this position. However, the left position does not need to be tested since it was the starting point of the former step. In the further steps of FIGS. 8B to 8F, the number of positions tested are respectively 3, 2, 2, 3 and 2. Then, in FIG. 8F, none of the two tested positions improve the TM cost. Therefore, as shown in FIG. 8G, the precision is enhanced (from 1-pel to ½-pel) and a finer search is performed. The same principle applies again and ¼-pel search is performed in FIG. 8H. FIG. 8I shows the successive refinement steps, with the final position with the minimum TM cost being the cross-filled circle. FIG. 8J illustrates how the refinement process maps onto the original grid.

Figure 9A:
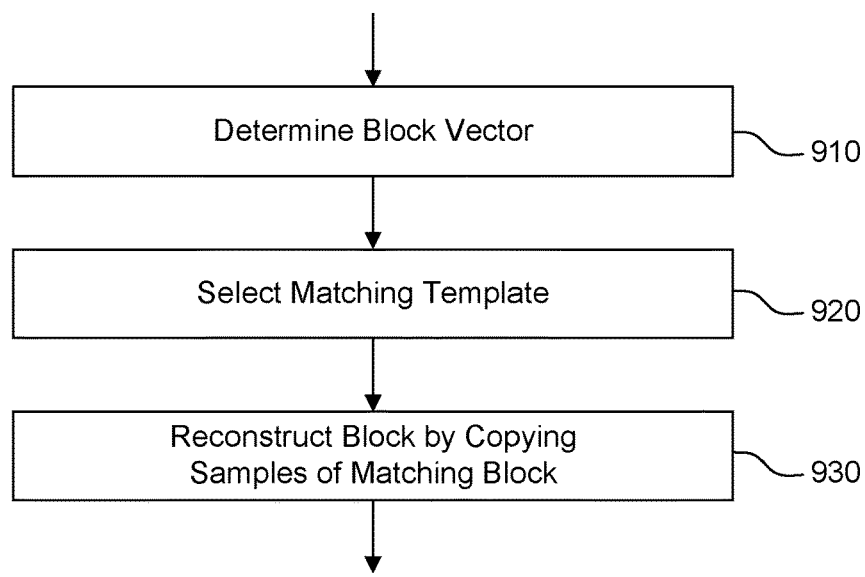
FIG. 9A describes a block reconstruction method according to an embodiment.

FIG. 9A describes a block reconstruction method according to an embodiment. This method is used both for encoding and for decoding and may be implemented for example in the intra-prediction module 160 of the encoder of FIG. 1 or in the intra-prediction module 260 of the decoder of FIG. 2 and more generally in the encoder/decoder module 1030 of the device 1000 of FIG. 3. The method applies to a current block. In step 910, a block vector is determined for the current block. On the decoder side, the block vector is determined by obtaining an information representative of the block vector from the bitstream. On the encoder side, the block vector is determined by a rate-distortion optimization (RDO) process. In step 920, a template comprising adjacent (or partly surrounding) samples of the current block is determined. In a search range region of the already reconstructed samples, this template is searched, and a best matching template of identical shape is determined. In step 930, the current block is reconstructed by copying samples of the block corresponding to the best matching template.

Figure 9B:
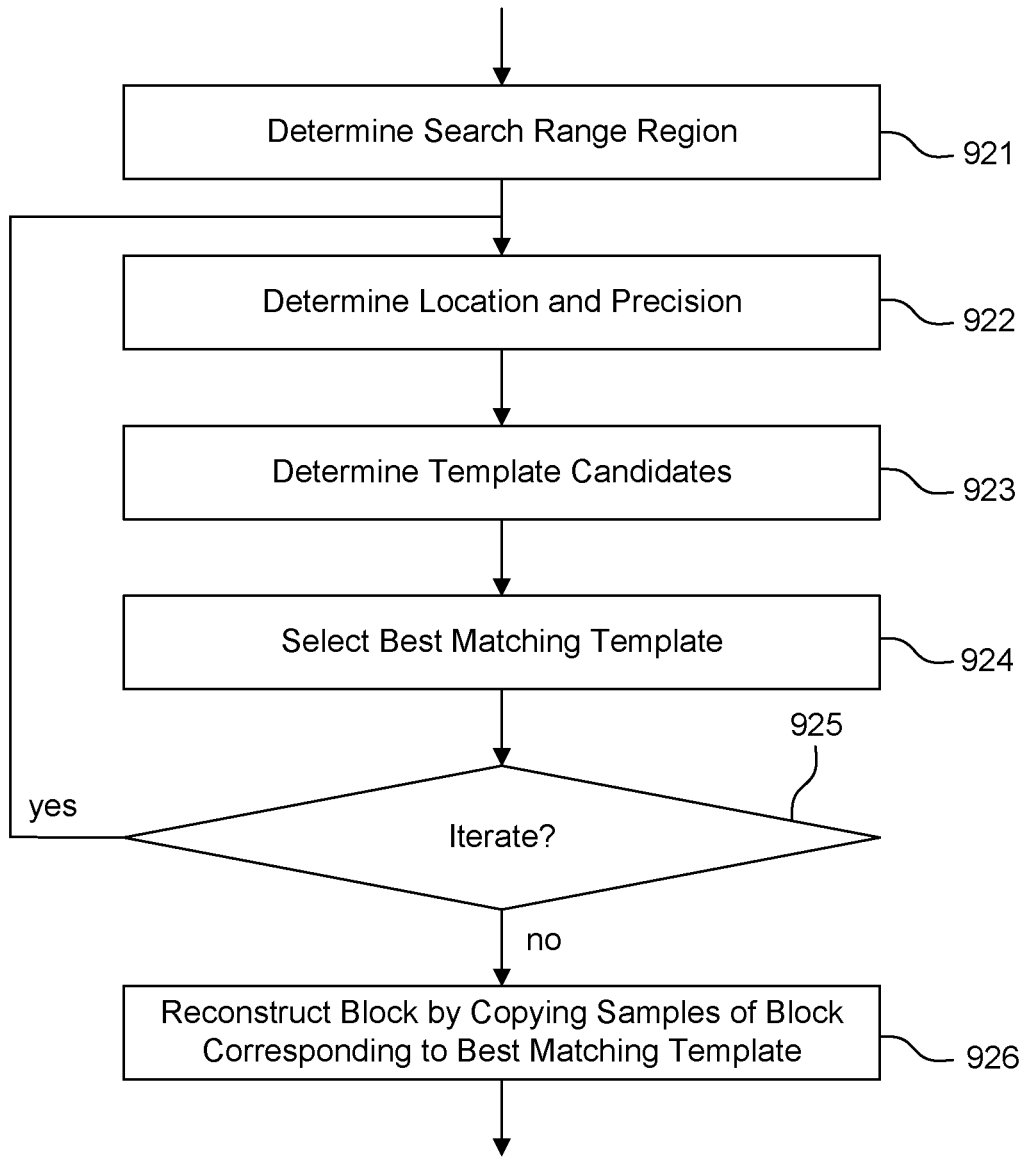
FIG. 9B describes a template matching method comprising refinement according to an embodiment.

FIG. 9B describes a template matching method comprising refinement according to an embodiment. This corresponds to step 920 of FIG. 9A and is an iterative process.

In step 921, the search range region is determined. This search region takes into account the borders of the picture and the reconstructed area. It can be of fixed size, for example, 32×32, or it can depend on the size of the initial precision, for example 8×8 if precision is 4-pel and 2×2 if the precision is 1-pel, or it can depend on the current block size, for example 8 pixels more than the block size, so if the block size is 16×8 than the window is 32×24.

In step 922, the precision is determined. In at least one decoding related embodiment, in the initial iteration, an initial precision is obtained from information from the bitstream. In at least one decoding related embodiment, in the initial iteration, an initial precision is predetermined. The first iteration of the method starts from a location indicated by the block vector and uses the initial precision. Further iterations may move the location to a new position and/or may refine the precision to a finer precision.

In step 923, the location and precision allow determining the template candidates. A so-called template candidate is a set of samples in the form of the template but located at a candidate location. Different techniques have been introduced above for determining the template candidates. In at least one embodiment, all candidates for which the distance (geometric) in any direction to the location is equal to the precision within the search range region are selected. For example, if the precision is 1-pel, all locations surrounding immediately the location are selected. In at least one embodiment, all candidates for which the distance in horizontal or vertical direction to the location is equal to the precision within the search range region are selected. This is the embodiment illustrated in FIGS. 8A to 8J. The template located at the current location is also part of the candidates. Candidates outside of the search range area are not considered.

In step 924, the best matching template is selected. This is done by first measuring a similarity between sample values of the considered template of the block with the sample values of the different template candidates, previously identified as TM cost. SAD is an example of metric to measure the similarity, but any other similarity metric may be used such as SATD (sum of absolute transformed differences) or MSE (mean squared error. When one of the template candidates provides a lower TM cost than the template at current location, then the method is iterated 925 again from step 922 from this new location. In at least one embodiment, when none of the template candidate provides a lower TM cost than the template at current location, then the method is iterated again from step 921 from the current location with finer precision. When no more improvement regarding TM cost is possible and when the maximal precision has been reached, the iteration stops and the candidate template is selected as being the best matching template, in other words, the candidate template for which the samples are most similar to the samples of the template of the block.

In step 926, the current block is reconstructed by copying the samples of the block corresponding to the selected candidate template.

Figure 10:
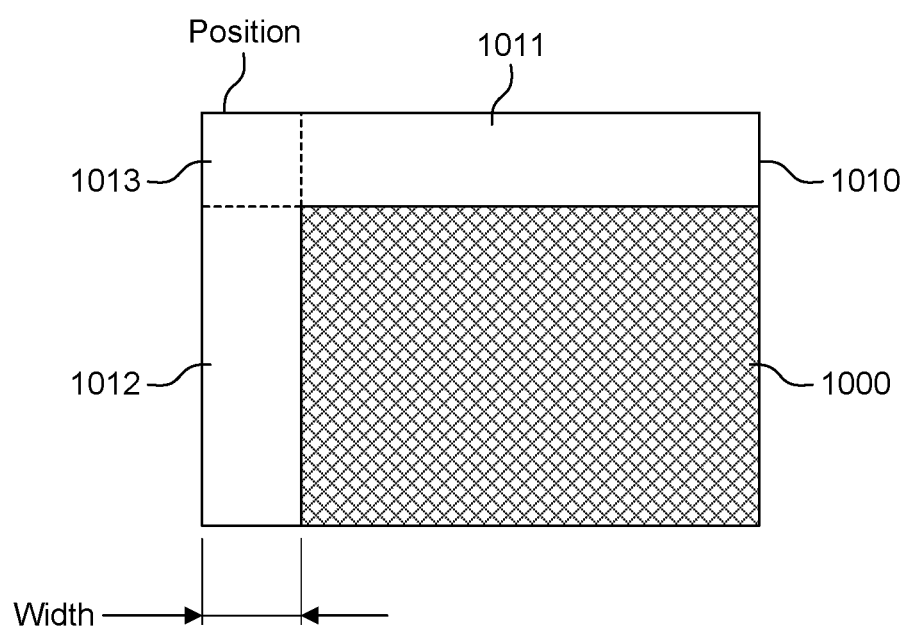
FIG. 10 illustrates the correspondence between a block and a template.

FIG. 10 illustrates the correspondence between a block and a template. This correspondence is done regarding the position and sizes of the block and the position, size and width of the template. A template 1010 is adjacent to the corresponding block 1000 (or partly surrounding the block) and comprises a number of lines of pixels 1011 at the top of the block, a number of columns of pixels 1012 at the left of the block, and a rectangle of pixels 1013 at the top left of the block filling the gap between the lines and columns. A 4 pixels wide and high template proved to be an efficient choice. Therefore, it is straightforward to determine a block from a template and vice versa. The figure illustrates a template for which the column width is equal to the row height and thus the rectangle 1013 is square. Other configurations are possible where these number are not equal. In at least one embodiment, the template width is one pixel and thus the template is a single line adjacent to the block.

Some additional syntax may be used to support the former embodiments.

According to at least an embodiment, an information representative of the internal IBC precision (for example 1, 2, 4 or 16-pel) may be signaled for the whole sequence at SPS level and adapted for each frame with additional signaling at picture or slice level. For example, the internal IBC precision can be set at SPS level to 8-pel, then the TM search window is 16-pel large, for one frame its picture header sets the refinement towards 1-pel and following frame its picture header sets the refinement towards ¼-pel, and so on. In a variant embodiment, the internal IBC precision is predefined and no additional syntax is thus needed.

According to at least an embodiment, an information item representative of the refinement precision may be signaled for the whole sequence at SPS level and adapted for each frame with additional signaling at picture or slice level. In a variant embodiment, the refinement precision is predefined and no additional syntax is thus needed.

This application describes a variety of aspects, including tools, features, embodiments, models, approaches, etc. Many of these aspects are described with specificity and, at least to show the individual characteristics, are often described in a manner that may sound limiting. However, this is for purposes of clarity in description, and does not limit the application or scope of those aspects. Indeed, all of the different aspects can be combined and interchanged to provide further aspects. Moreover, the aspects can be combined and interchanged with aspects described in earlier filings as well.

The aspects described and contemplated in this application can be implemented in many different forms. FIGS. 1, 2 and 3 provide some embodiments, but other embodiments are contemplated and the discussion of these figures does not limit the breadth of the implementations. At least one of the aspects generally relates to video encoding and decoding, and at least one other aspect generally relates to transmitting a bitstream generated or encoded. These and other aspects can be implemented as a method, an apparatus, a computer readable storage medium having stored thereon instructions for encoding or decoding video data according to any of the methods described, and/or a computer readable storage medium having stored thereon a bitstream generated according to any of the methods described.

Various methods are described herein, and each of the methods comprises one or more steps or actions for achieving the described method. Unless a specific order of steps or actions is required for proper operation of the method, the order and/or use of specific steps and/or actions may be modified or combined.

Various methods and other aspects described in this application can be used to modify modules, for example, the intra-prediction modules (160, 260), of a video encoder 100 and decoder 200 as shown in FIG. 1 and FIG. 2. Moreover, the present aspects are not limited to VVC or HEVC, and can be applied, for example, to other standards and recommendations, whether pre-existing or future-developed, and extensions of any such standards and recommendations (including VVC and HEVC). Unless indicated otherwise, or technically precluded, the aspects described in this application can be used individually or in combination.

Various numeric values are used in the present application. The specific values are for example purposes and the aspects described are not limited to these specific values.

Various implementations involve decoding. "Decoding", as used in this application, can encompass all or part of the processes performed, for example, on a received encoded sequence in order to produce a final output suitable for display. In various embodiments, such processes include one or more of the processes typically performed by a decoder. In various embodiments, such processes also, or alternatively, include processes performed by a decoder of various implementations described in this application.

As further examples, in one embodiment "decoding" refers only to entropy decoding, in another embodiment "decoding" refers only to differential decoding, and in another embodiment "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence in order to produce an encoded bitstream. In various embodiments, such processes include one or more of the processes typically performed by an encoder. In various embodiments, such processes also, or alternatively, include processes performed by an encoder of various implementations described in this application.

As further examples, in one embodiment "encoding" refers only to entropy encoding, in another embodiment "encoding" refers only to differential encoding, and in another embodiment "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that the syntax elements as used herein, are descriptive terms. As such, they do not preclude the use of other syntax element names.

This disclosure has described various pieces of information, such as for example syntax, that can be transmitted or stored, for example. This information can be packaged or arranged in a variety of manners, including for example manners common in video standards such as putting the information into an SPS, a PPS, a NAL unit, a header (for example, a NAL unit header, or a slice header), or an SEI message. Other manners are also available, including for example manners common for system level or application level standards such as putting the information into one or more of the following:

a. SDP (session description protocol), a format for describing multimedia communication sessions for the purposes of session announcement and session invitation, for example as described in RFCs and used in conjunction with RTP (Real-time Transport Protocol) transmission.

b. DASH MPD (Media Presentation Description) Descriptors, for example as used in DASH and transmitted over HTTP, a Descriptor is associated to a Representation or collection of Representations to provide additional characteristic to the content Representation.

c. RTP header extensions, for example as used during RTP streaming.

d. ISO Base Media File Format, for example as used in OMAF and using boxes which are object-oriented building blocks defined by a unique type identifier and length also known as 'atoms' in some specifications.

e. HLS (HTTP live Streaming) manifest transmitted over HTTP. A manifest can be associated, for example, to a version or collection of versions of a content to provide characteristics of the version or collection of versions.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Various embodiments refer to rate distortion optimization. In particular, during the encoding process, the balance or trade-off between the rate and distortion is usually considered, often given the constraints of computational complexity. The rate distortion optimization is usually formulated as minimizing a rate distortion function, which is a weighted sum of the rate and of the distortion. There are different approaches to solve the rate distortion optimization problem. For example, the approaches may be based on an extensive testing of all encoding options, including all considered modes or coding parameters values, with a complete evaluation of their coding cost and related distortion of the reconstructed signal after coding and decoding. Faster approaches may also be used, to save encoding complexity, in particular with computation of an approximated distortion based on the prediction or the prediction residual signal, not the reconstructed one. Mix of these two approaches can also be used, such as by using an approximated distortion for only some of the possible encoding options, and a complete distortion for other encoding options. Other approaches only evaluate a subset of the possible encoding options. More generally, many approaches employ any of a variety of techniques to perform the optimization, but the optimization is not necessarily a complete evaluation of both the coding cost and related distortion.

This application describes a variety of aspects, including tools, features, embodiments, models, approaches, etc. Many of these aspects are described with specificity and, at least to show the individual characteristics, are often described in a manner that may sound limiting. However, this is for purposes of clarity in description, and does not limit the application or scope of those aspects. Indeed, all of the different aspects can be combined and interchanged to provide further aspects. Moreover, the aspects can be combined and interchanged with aspects described in earlier filings as well.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented in, for example a processor, which refers to processing devices in general, including, for example, a computer, a microprocessor, an integrated circuit, or a programmable logic device. Processors also include communication devices, such as, for example, computers, tablets, smartphones, cell phones, portable/personal digital assistants, and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information can include one or more of, for example, estimating the information, calculating the information, predicting the information, or retrieving the information from memory.

Further, this application may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

In the present application, the terms "reconstructed" and "decoded" may be used interchangeably, the terms "pixel" and "sample" may be used interchangeably, the terms "image," "picture", "frame", "slice" and "tiles" may be used interchangeably. Usually, but not necessarily, the term "reconstructed" is used at the encoder side while "decoded" is used at the decoder side.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments the encoder signals a particular one of an illumination compensation parameter. In this way, in an embodiment the same parameter is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the bitstream of a described embodiment. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

We describe a number of embodiments. Features of these embodiments can be provided alone or in any combination, across various claim categories and types. Further, embodiments can include one or more of the following features, devices, or aspects, alone or in any combination, across various claim categories and types:

a device comprising an apparatus according to any of the decoding embodiments: and at least one of (i) an antenna configured to receive a signal, the signal including the video block, (ii) a band limiter configured to limit the received signal to a band of frequencies that includes the video block, or (iii) a display configured to display an output representative of the video block.

In variants of first aspect, the set of template candidates is determined by selecting all possible candidates according to the location and precision, the set of template candidates is determined by selecting candidates according to the location and precision in both horizontal and vertical directions, the location of the selected template is refined through iterations on the template candidates by modifying the location until the similarity of the template candidate at the current location is better than the similarity of the other template candidates, the location of the selected template is refined through iterations on the template candidates by refining the precision in the condition that the similarity of the template candidate at the current location is better than the similarity of the other template candidates, an initial location of a template for an initial iteration is determined by techniques of motion coding modes such as merge mode or Advanced Motion Vector Prediction, AMVP, and wherein the motion coding modes apply to reconstructed block of the picture, an initial location of a template for an initial iteration is determined using a coarse precision of 8 or 16 pixels and wherein the iterations refine the precision to at most 1-pel or sub-pel precision, an initial precision is obtained from information of in the bitstream

The invention claimed is:

1. A method comprising:
    determining a template based on L-shaped samples surrounding a block of a picture of a video;
    determining an initial location for an initial iteration;
    selecting a matching template among a set of template candidates in reconstructed blocks of the picture, wherein the set of template candidates is determined based on a determined location and wherein the matching template is selected based on a similarity measure between samples of the template and samples of the template candidates;
    refining the selection by iterating over the selection step while the similarity of a template candidate is better than the similarity of the other template candidates and, on a condition that the similarity of the template candidate at a current location is better than the similarity of the other template candidates of the set of template candidates, refining the selection by iterating over a further set of template candidates for which the location is determined with a finer precision; and
    reconstructing the block by copying samples of the selected matching template into the block,
    wherein, for the initial iteration over the selection step, the location is determined by the initial location and wherein, for further iterations, the location is determined as a refinement based on the location of the selected matching template of the previous iteration.

2. The method of claim 1, wherein the set of template candidates are selected based on a precision.

3. The method of claim 2, wherein the initial location for the initial iteration of the selection step is determined using a coarse precision of 8 or 16 pixels.

4. The method of claim 1, wherein the initial location for the initial iteration of the selection step is determined by techniques of motion coding modes such as merge mode or advanced motion vector prediction and wherein the motion coding modes apply to reconstructed blocks of the picture.

5. The method of claim 2, wherein the initial precision for the initial iteration of the selection step is obtained from information in the bitstream.

6. The method of claim 2, wherein the set of template candidates is determined by selecting candidates according to a sampling of a search region according to the precision.

7. The method of claim 2, wherein the set of template candidates is determined by selecting candidates according to a location and precision in both horizontal and vertical directions.

8. The method of claim 1, further comprising:
decoding picture data using the reconstructed block.

9. The method of claim 1, further comprising:
encoding picture data using the reconstructed block.

10. An apparatus for video decoding, the apparatus comprising one or more processors configured to:
determine a template based on L-shaped samples surrounding a block of a picture of a video;
determine an initial location for an initial iteration;
select a matching template among a set of template candidates in reconstructed blocks of the picture, wherein the set of template candidates is determined based on a determined location and wherein the matching template is selected based on a similarity measure between samples of the template and samples of the template candidates;
refine the selection by iterating over the selection step while the similarity of a template candidate is better than the similarity of the other template candidates and, on a condition that the similarity of the template candidate at a current location is better than the similarity of the other template candidates of the set of template candidates, refine the selection by iterating over a further set of template candidates for which the location is determined with a finer precision;
reconstruct the block by copying samples of the selected matching template into the block, wherein, for the initial iteration over the selection step, the location is determined by the initial location and wherein, for further iterations, the location is determined as a refinement based on the location of the selected matching template of the previous iteration; and
decode picture data using the reconstructed block.

11. The apparatus of claim 10, wherein the set of template candidates are selected based on a precision.

12. The apparatus of claim 11, wherein the initial location for the initial iteration of the selection step is determined using a coarse precision of 8 or 16 pixels.

13. The apparatus of claim 11, wherein the initial precision for the initial iteration of the selection step is obtained from information in the bitstream.

14. The apparatus of claim 11, wherein the set of template candidates is determined by selecting candidates according to a sampling of a search region according to the precision.

15. The apparatus of claim 11, wherein the set of template candidates is determined by selecting candidates according to a location and precision in both horizontal and vertical directions.

16. An apparatus for video encoding, the apparatus comprising one or more processors configured to:
determine a template based on L-shaped samples surrounding a block of a picture of a video;
determine an initial location for an initial iteration;
select a matching template among a set of template candidates in reconstructed blocks of the picture, wherein the set of template candidates is determined based on a determined location and wherein the matching template is selected based on a similarity measure between samples of the template and samples of the template candidates;
refine the selection by iterating over the selection step while the similarity of a template candidate is better than the similarity of the other template candidates and, on a condition that the similarity of the template candidate at a current location is better than the similarity of the other template candidates of the set of template candidates, refine the selection by iterating over a further set of template candidates for which the location is determined with a finer precision;
reconstruct the block by copying samples of the selected matching template into the block, wherein, for the initial iteration over the selection step, the location is determined by the initial location and wherein, for further iterations, the location is determined as a refinement based on the location of the selected matching template of the previous iteration; and
encode picture data using the reconstructed block.

17. A computer program comprising program code instructions for implementing the steps of the method according to claim 1 when executed by a processor.

18. A non-transitory computer readable medium comprising program code instructions for implementing the steps of the method according to claim 1 when executed by a processor.

* * * * *